US008186496B2

(12) United States Patent
Potonniee

(10) Patent No.: US 8,186,496 B2
(45) Date of Patent: May 29, 2012

(54) SMART CARD CUSTOMIZATION

(75) Inventor: Olivier Potonniee, Marseilles (FR)

(73) Assignee: Gemalto SA, Meudon (FR)

( * ) Notice: Subject to any disclaimer, the term of this patent is extended or adjusted under 35 U.S.C. 154(b) by 820 days.

(21) Appl. No.: 12/083,493

(22) PCT Filed: Oct. 11, 2006

(86) PCT No.: PCT/EP2006/067274
§ 371 (c)(1),
(2), (4) Date: May 16, 2008

(87) PCT Pub. No.: WO2007/042533
PCT Pub. Date: Apr. 19, 2007

(65) Prior Publication Data
US 2009/0065325 A1    Mar. 12, 2009

(30) Foreign Application Priority Data

Oct. 14, 2005    (FR) ..................... 05 53134

(51) Int. Cl.
*G06Q 30/00* (2006.01)
(52) U.S. Cl. ......................... 194/214; 705/66
(58) Field of Classification Search .......... 194/210, 194/214; 705/66, 325, 65, 67; 235/375, 235/379, 380, 382, 382.5
See application file for complete search history.

(56) References Cited

U.S. PATENT DOCUMENTS

| | | | |
|---|---|---|---|
| 5,715,431 A * | 2/1998 | Everett et al. ................. | 711/156 |
| 5,960,082 A | 9/1999 | Haenel | |
| 6,233,683 B1 * | 5/2001 | Chan et al. ..................... | 713/172 |
| 6,547,150 B1 * | 4/2003 | Deo et al. ...................... | 235/492 |
| 6,585,155 B2 * | 7/2003 | Nishimura ..................... | 235/381 |

FOREIGN PATENT DOCUMENTS

| EP | 0 565 389 A1 | 10/1993 |
|---|---|---|
| EP | 0 949 595 A2 | 10/1999 |
| EP | 1 004 992 A2 | 5/2000 |
| EP | 1 376 492 A1 | 1/2004 |
| FR | 0 216 418 A1 | 5/2002 |
| WO | WO 99/42960 A1 | 8/1999 |
| WO | WO 01/60026 A1 * | 8/2001 |

OTHER PUBLICATIONS

English Translation of WO 01/60026 A1 (9 Pages).*
Stephane Bonnet et al., "A Model-Driven Approach for Smart Card Configuration", Generative Programming and Component Engineering, Third International Conference, vol. 3286, Jan. 2004, pp. 416-435.
International Search Report (PCT/ISA/210).

* cited by examiner

*Primary Examiner* — Mark Beauchaine
(74) *Attorney, Agent, or Firm* — Buchanan Ingersoll & Rooney PC

(57) ABSTRACT

The invention concerns a method for reducing factory customizing time in a smart card ($CP_n$), wherein a pre-customizing manager (GM) into a customizing machine loads post-customizing data (AP, $OP_1$-$OP_1$, $DOP_1$-$DOP_1$) in the smart card. Then a post-customizing application (AP) included in the smart card is enabled after delivery of the card to a user following a connection of the smart card to a terminal to process the loaded post-customizing data so as to make the smart card operational.

12 Claims, 3 Drawing Sheets

SMART CARD CUSTOMIZATION

FIELD OF THE INVENTION

The present invention relates to smart card customization.

More particularly, it relates to customizing a smart card once said smart card has been delivered to a final or "end" user, in order to make said smart card operational.

BACKGROUND OF THE INVENTION

Customizing a smart card or "microcontroller card" consists in loading data such as applications and parameters thereof, and in diversifying the contents of each smart card depending on its final user. Such customization involves, inter alia, downloading secret data, such as authentication keys, and personal data, such as a name or an identity number.

Smart card customization is executed by a customization machine in the factory that manufactures the cards, and it is subjected to time constraints that affect that cost of manufacturing a smart card. Currently, customizing a smart card requires a few seconds. If the customization requires a longer processing time, the price of the smart card increases.

Since smart card customization is becoming increasingly complex and since the number of applications to be implemented in smart cards is growing, the cost of producing each smart card is becoming increasingly high.

SUMMARY OF THE INVENTION

An object of the invention is to reduce the cost of customizing smart cards without increasing the time required to customize them in the factory, while also satisfying the growing need for customization data and accommodating the increasing storage capacity of smart cards.

In order to achieve this object, a method of customizing a smart card is characterized in that it comprises:

pre-customization for causing post-customization data to be loaded into the smart card by a customization machine; and post-customization for processing, in the smart card, the loaded post-customization data, following connection of the smart card to a terminal of a user, in order to make the smart card operational.

Customizing a smart card in accordance with the invention is thus divided into two portions: pre-customization that is performed during manufacture of the smart card, and post-customization that is performed after the smart card is delivered to a final user and once power is supplied to the smart card by it being connected to the terminal. The post-customization thus avoids increasing the factory customization time. So long as not all of the customization of the smart card is finished, the card is not operational and cannot be used normally by a final user.

Preferably, the post-customization data loaded in the smart card comprises a post-customization application and customization operations. During the post-customization, the post-customization application executes correctly and successively all of the customization operations so that the smart card is operational.

In a variant of the invention, on executing one of the customization operations, a network connection application is activated by said customization operation in order to communicate with a server via the terminal for the purpose of downloading, into the smart card, data and/or codes relating to execution of said customization operation.

The invention also provides a system for customizing a smart card, which system is characterized in that it comprises:

pre-customization means for causing post-customization data to be loaded into the smart card by a customization machine; and post-customization means included in the smart card for the purpose of processing the loaded post-customization data, following connection of the smart card to a terminal, in order to make the smart card operational.

The invention also provides a smart card to be customized, which smart card contains post-customization means for processing post-customization data that was loaded into the smart card by a customization machine during pre-customization, following connection of the smart card to a terminal, in order to make the smart card operational.

Finally, the invention provides a program suitable for being implemented in the system for customizing a smart card, which program comprises instructions which, when the program is executed in said system, perform the steps of the method of the invention.

BRIEF DESCRIPTION OF THE DRAWINGS

Other characteristics and advantages of the present invention appear more clearly on reading the following description of preferred implementations of the invention, given by way of non-limiting example and with reference to the corresponding accompanying drawings, in which.

DETAILED DESCRIPTION OF THE DRAWINGS

In accordance with the invention, customizing a smart card comprises two distinct steps, namely pre-customization and post-customization of the card.

Pre-customization is executed by a customization machine installed in a factory for manufacturing smart cards, and said pre-customization comprises, in particular, loading data necessary for post-customizing the card into said card.

Post-customization of the card is executed by the card after it has been delivered to a user of said card and while the card is connected to a terminal. Post-customization consists in making the card operational by finishing customization thereof.

Figure 1:
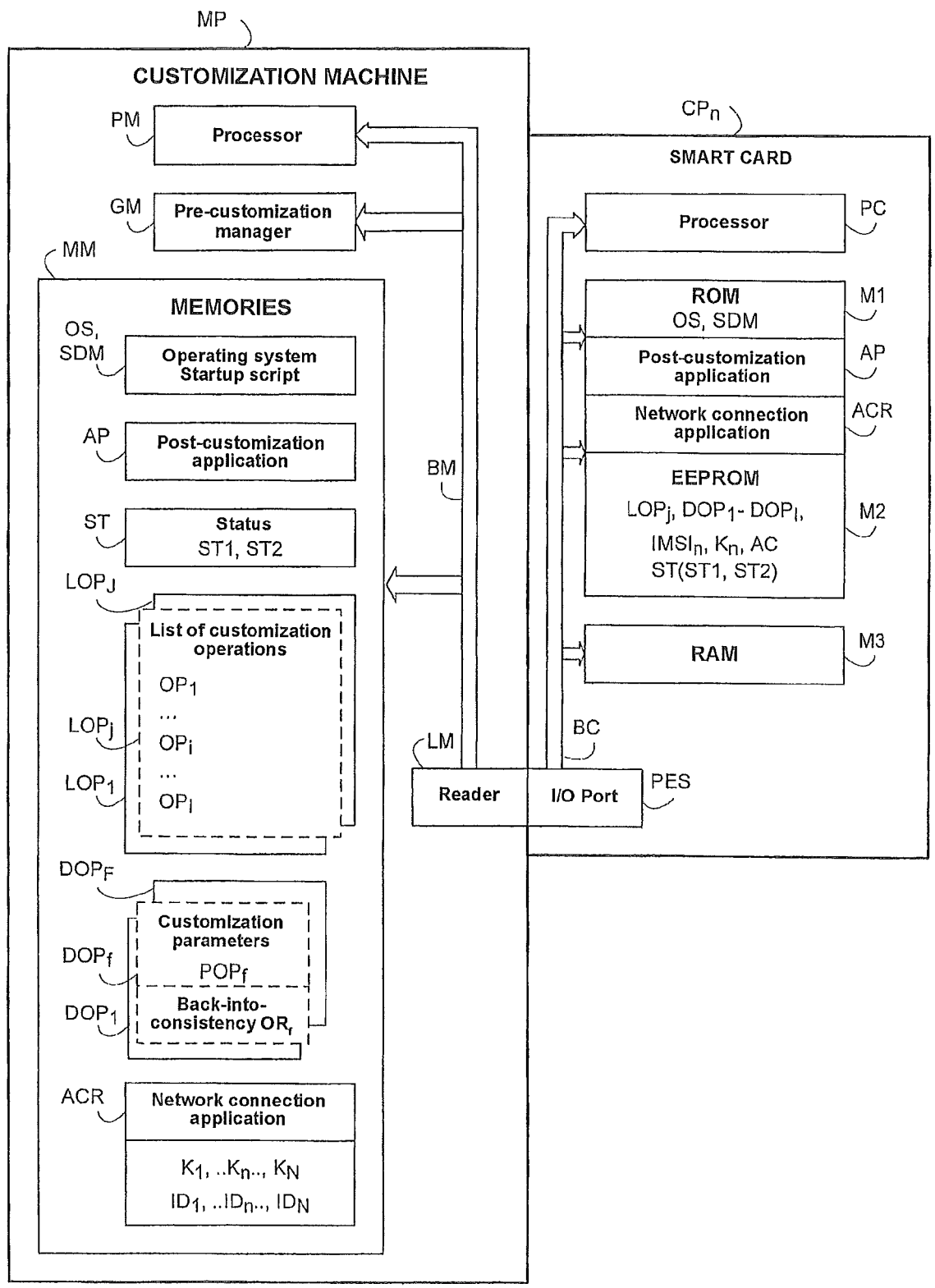
FIG. 1 is a block diagram showing a system of the invention for pre-customizing a smart card that is connected to a customization machine.

As shown in FIG. 1, a system for pre-customizing a smart card during manufacture thereof, comprises a customization machine MP for pre-customizing N smart cards, the machine communicating with at least one smart card $CP_n$, where n lies in the range 1 to N. In the customization machine MP and in the smart card $CP_n$, only those function blocks that perform functions related to the invention are shown, and said blocks can correspond to software modules and/or to hardware modules.

The smart card $CP_n$, also referred to as a "microcontroller card" or as an "integrated circuit card", constitutes a user identity module of the Universal Integrated Circuit Card (UICC) type that is removably received in a terminal T. For example, the smart card is a card provided with a Subscriber Identity Module (SIM) application when the terminal is a mobile terminal of the Global System for Mobile Communications (GSM) type or of the General Packet Radio Service (GPRS) type, or with a Universal Subscriber Identity Module (USIM) application, with a Removable User Identity Module (RUIM) application, or with an Internet Protocol (IP) Multimedia Services Identity Module (ISIM) application when the terminal is a mobile terminal operating in Code Division Multiple Access (CDMA) of the third generation ($3^{rd}$ Generation Partnership Project (3GPP)) of the Universal Mobile Telecommunications System (UMTS) type or of the UMTS Terrestrial Radio Access Network (UTRAN) type, or of the third generation ($3^{rd}$ Generation Partnership Project 2 (3GPP2)) of the CDMA2000 type.

More generally, the smart card $CP_n$ is a portable electronic object such as a debit card or a credit card, an electronic purse, a Universal Serial Bus (USB) key or stick, a Multimedia Card (MMC), a Secure Digital (SD) card, an additional smart card, or any other small or miniature electronic device.

The smart card $CP_n$ comprises mainly, in integrated form, one or more microprocessors PC, a non-rewritable memory M1 of the Read-Only Memory (ROM) type or of the Flash type, a non-volatile memory M1 of the Electrically Erasable Programmable ROM (EEPROM) type or of the Flash type, and a memory M3 of the Random Access Memory (RAM) type or of the Static RAM (SRAM) type serving more particularly for data processing. The card $CP_n$ communicates, with or without contact, with the customization machine MP via an input/output port PES and via a reader LM of the machine MP. The various elements of the card are interconnected via a both-way bus BC.

Before the smart card is pre-customized by the customization machine MP, the memories M1 to M3 of the card are empty.

The customization machine MP comprises a processor MP, a pre-customization manager GM for loading customization data into the smart card $CP_n$, memories MM, and a reader LM for communicating with the smart card via the input/output port PES of the smart card $CP_n$. The various elements of the customization machine MP are interconnected via a both-way bus BM.

The memories MM in the customization machine MP contain, in particular, post-customization data to be loaded by the pre-customization manager GM into the card $CP_n$ during pre-customization. The post-customization data comprises mainly a smart card operating system OS, a startup script SDM, a post-customization application AP, a customization status ST, J lists of customization operations $LOP_1$ to $LOP_J$, and F customization operation descriptions $DOP_1$ to $DOP_F$. The post-customization data can also comprise a network connection application ACR, N items of identification data of the International Mobile Subscriber Identity (IMSI) type $IMSI_1$ to $IMSI_N$, and N items of authentication data $K_1$ to $K_N$ for respective ones of the N smart cards to be customized, and an encryption algorithm AC.

In a first implementation, the post-customization application AP is a generic application to be loaded into all of the smart cards during the pre-customization. The application AP is based on a list of customization operations also loaded into each card during pre-customization and is executed in the card after said card has been connected to a terminal during post-customization.

Each list of customization operations $LOP_j$, in the memories MM of the customization machine, where $1 \leq j \leq J$, corresponds to a specific post-customization of at least one smart card into which the list is loaded. The list of customization operations $LOP_j$ comprises, for example, I successive customization operations $OP_1$ to $OP_I$.

In a second implementation, the memories MM of the customization machine do not contain any lists of customization operations $LOP_1$ to $LOP_J$, but rather they contain J post-customization applications. Each application concerns post-customization specific to at least one smart card, and it comprises a succession of customization operations.

Each customization operation $OP_i$ contained either in a list of customization operations, or in a post-customization application, where $1 \leq i \leq I$, comprises a series of instructions executed by the post-customization application AP. Each customization operation $OP_i$ is associated with an operation description $DOP_i$ and with an identity number i corresponding, for example, to the rank of the operation in the list of customization operations $LOP_j$ or in the post-customization application.

A customization operation is, for example, initialization of a memory zone of the smart card at a given or determined value, execution of an application such as a security function, or downloading from a remote server S of a set of data or of an executable code to be stored in a memory of the smart card. With reference to the latter example, the customization operation comprises an activation instruction for activating a network connection application ACR loaded in the card so that said card connects up to the remote server S that requires an identity $IMSI_n$ of the card and an authentication key $K_n$ that are also loaded into the smart card.

The F customization operation descriptions $DOP_1$ to $DOP_F$ stored in the memories MM of the customization machine MP are associated with F customization operations that are distinct from one another, and that are listed in the set of the J lists of customization operations $LOP_1$ to $LOP_J$ in the first implementation, or of the J post-customization applications in the second implementation.

Each customization operation description $DOP_f$, where $1 \leq f \leq F$, contains mainly parameters $POP_f$ necessary for executing the customization operation $OP_f$. When the customization operation $OP_f$ has been interrupted, the description $DOP_f$ can also comprise a back-into-consistency operation $OR_f$ for putting post-customization back into consistency with the state of the card prior to execution of the customization operation, thereby canceling that operation, or back into consistency with an end of customization operation state, thereby guaranteeing continuity for the post-customization.

The customization status ST indicates the state of the post-customization of a smart card at a given instant. The status ST is read by the post-customization application each time the smart card is connected to a terminal, and it indicates which customization operation was in progress prior to a possible interruption in the post-customization, and whether or not the operation had finished. The status ST is made up of two elements ST1 and ST2. The first status element ST1 includes the identity number of the customization operation in progress. The second status element ST2 is, for example, a bit for indicating by the "1" state that the customization operation designated by the first status element ST1 is finished, and by the "0" state that that operation is not finished.

In a variant, the status ST in the memory MZ comprises a number of bits associated with respective ones of the operations to be executed. The bit associated with an operation goes from the "0" state to the "1" state irreversibly when the associated operation is executed correctly.

Figure 2:
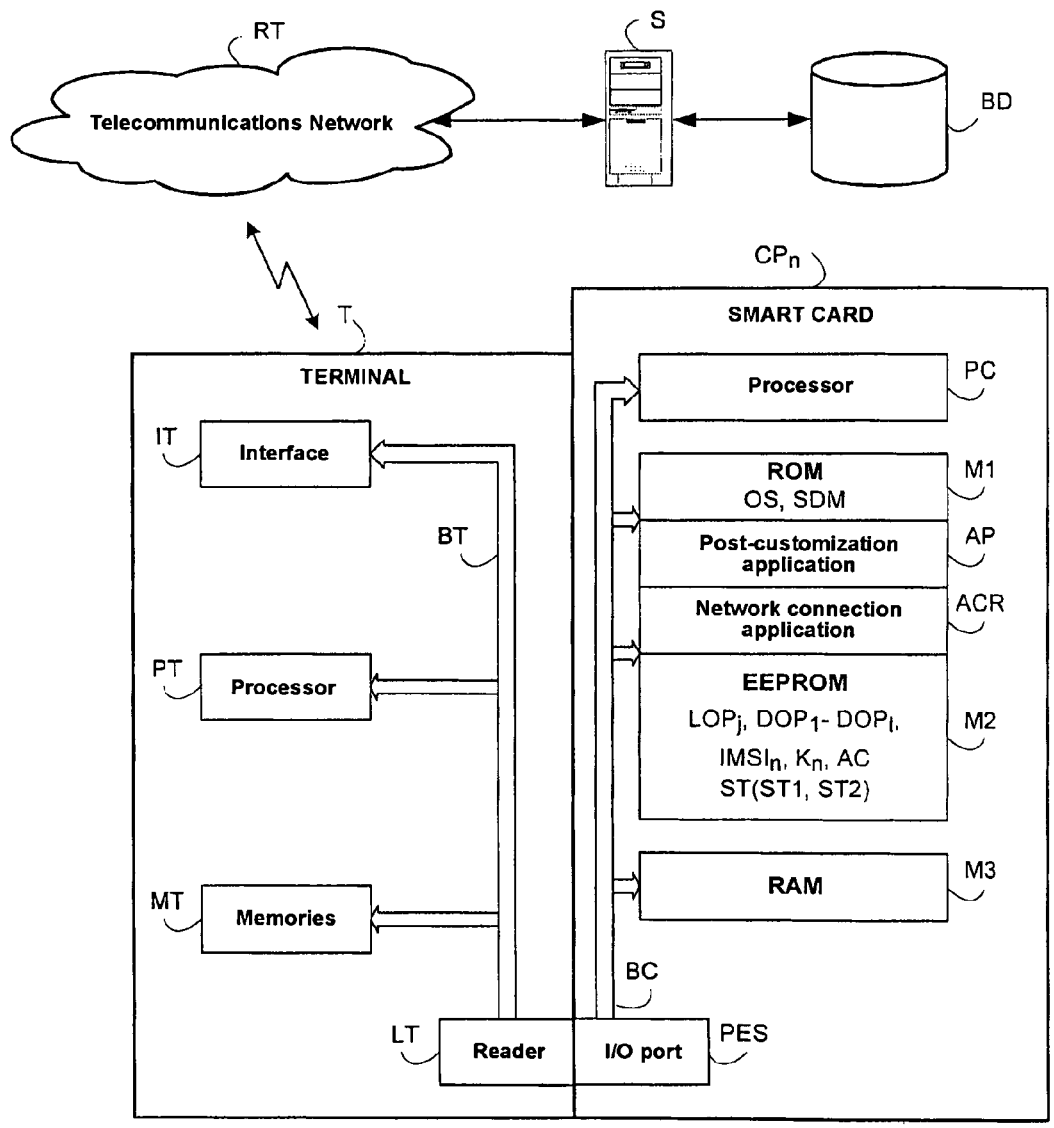
FIG. 2 is a block diagram showing a system of the invention for post-customizing a smart card that is connected to a terminal.

With reference to FIGS. 1 and 2, and in the first implementation of the invention, the smart card $CP_n$ contains mainly, after manufacture and pre-customization, the stored operating system OS and the startup script SDM in the memory M1, the post-customization application AP stored in the memories M1 and M2, a list of customization operations $LOP_j$, and operation descriptions $OP_1$ to $OP_I$ associated with the operations $OP_1$ to $OP_I$ of the list $LOP_j$ in the memory M2, and the customization status ST in the memory M2.

The smart card can, in the memories M1 and M2, contain the network connection application ACR, and, in the memory M2, contain an identity $IMSI_n$ of the card, an authentication key $K_n$, and the encryption algorithm AC.

With reference to FIG. 2, a card post-customization system comprises a terminal T communicating with the pre-customized smart card $CP_n$ delivered to a final user.

The terminal T is included in a telecommunications network RT, e.g. of the GSM type, of the GPRS type, or of the UMTS type, and can communicate with a remote server S via the network RT during post-customization. This communication can be initiated by a customization operation in order to download customization data and/or customization codes so as to make the smart card operational. The customization data and/or customization codes can be stored in a database BD connected to or integrated in the server S.

In other examples, the terminal T can be replaced by any terminal with which a smart card can communicate, and can be a message transmission portable device, or a Personal Computer (PC) equipped with a card reader, or a fixed terminal such as a banking terminal receiving a debit or credit smart card. For example, the network RT is then an intranet, a wireless local area network, or the Internet.

The terminal T contains a reader LT that is connected to an input/output port PES of the smart card $CP_n$ with or without electrical contact being established.

In addition to the smart card reader LT, the terminal further comprises, in conventional manner, a network interface IT, a processor PT, and memories MT. The various elements of the terminal are interconnected via a both-way bus BT.

Figure 3:
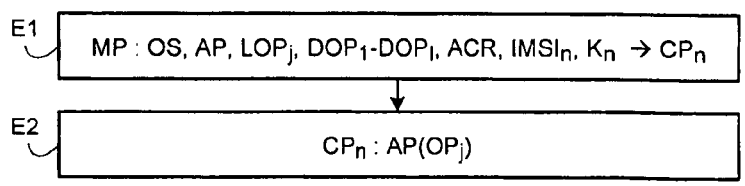
FIG. 3 is a flow chart showing an algorithm of a method of the invention for customizing a smart card.

With reference to FIG. 3 and in the first implementation of the invention, the method of customizing a smart card $CP_n$ of the invention comprises two main steps E1 and E2.

Step E1 is constituted by the customization machine MP pre-customizing the smart card $CP_n$ while said card is being manufactured in the factory. As described above, the pre-customization manager GM in the machine MP loads into the card $CP_n$ the operating system OS, the startup script SDM, the post-customization application AP, a list of customization operations $LOP_j$, customization operation descriptions $DOP_1$ to $DOP_I$ associated with the customization operations $OP_1$ to $OP_I$ contained in the list $LOP_j$, and status elements ST1 and ST2 at a value, for example, of zero, indicating that post-customization has not started.

The pre-customization manager GM of the customization machine MP can also load into the card $CP_n$ the network connection application ACR, the identity of the card $IMSI_n$, the authentication key $K_n$, and the encryption algorithm AC.

In the second implementation of the invention, the machine MP does not load a list of customization operations, but rather it loads a specific post-customization application that comprises a succession of customization operations.

Step E2 consists in post-customizing the smart card after said card has been given to a user and while said card is connected to the terminal T. Post-customization is triggered by activating the post-customization application AP that successively executes the customization operations $OP_1$ to $OP_I$ contained either in the list of customization operations $LOP_j$, or directly in the application AP. So long as not all of the customization operations are executed and finished, the smart card is not operational.

Figure 4:
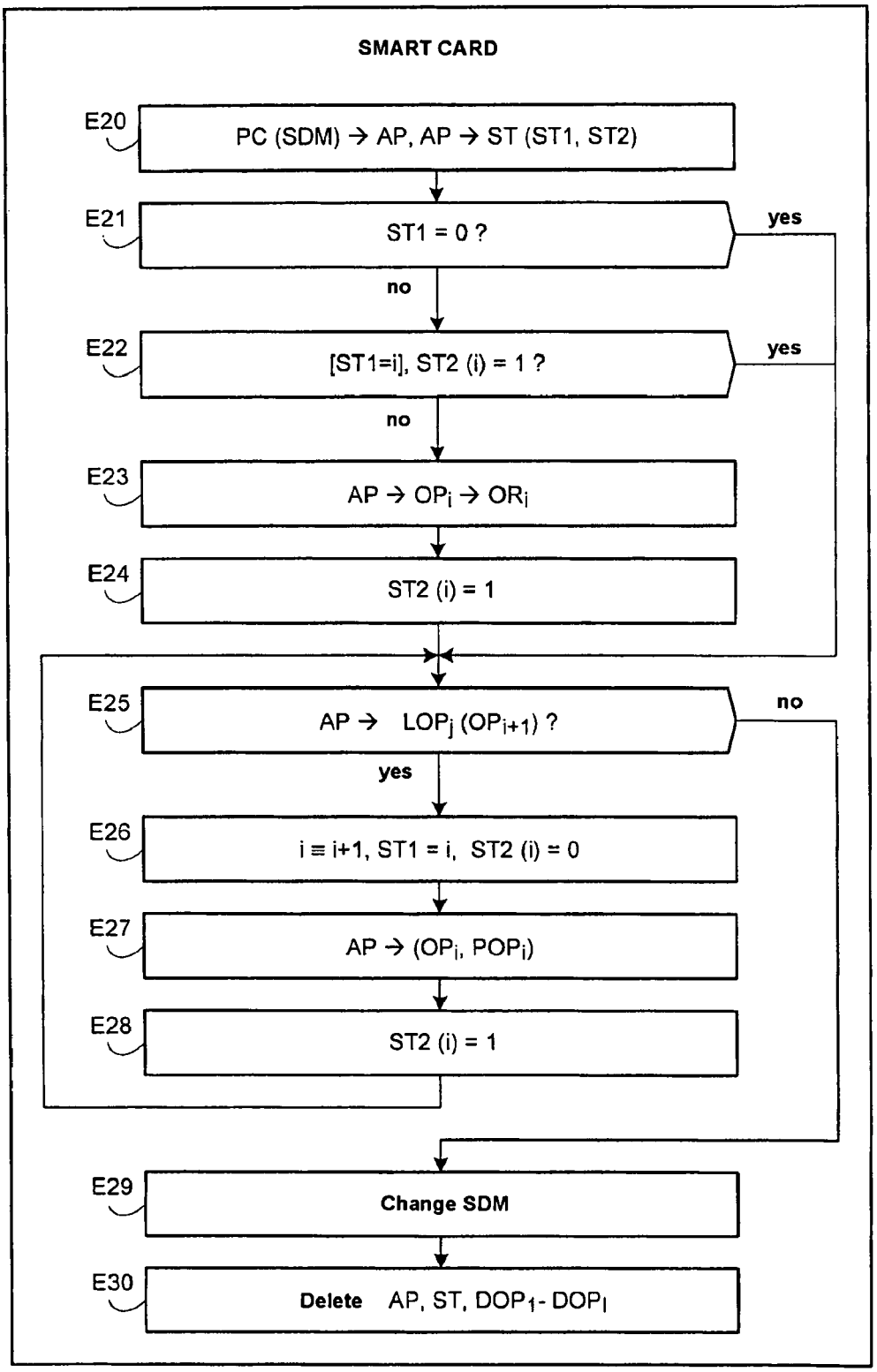
FIG. 4 is a flow chart showing an algorithm of a method of the invention for post-customizing a smart card.

The algorithm of the post-customization method is shown in FIG. 4, and it comprises steps E20 to E30.

In FIG. 4, "i" corresponds to the identity number of the customization operation $OP_i$ that is being executed. When the smart card is connected to the terminal T for the first time, the index i is at the value zero and no customization operation loaded in the card is executed.

Each time the smart card is connected to the terminal T, and in step E20, the processor PC executes the startup script SDM that has an instruction for activating the post-customization application AP. The application AP reads the customization status ST in order to determine the state of the customization of the card since the post-customization of the card can be interrupted at any time, e.g. by the card being extracted in untimely manner from the reader LT of the terminal.

If, in step E21, the status element ST1 has a zero value indicating that no customization operation has been executed, the post-customization application AP checks, in step E25, whether a customization operation $OP_{i+1}$ is to be executed.

If, in step E21, the value of the status element ST1 is equal to a non-zero value i indicating that a customization operation has already been executed or was being executed when an interruption occurred, the post-customization application AP reads the second status element ST2, in step E22, in order to determine the state of execution of the customization operation $OP_i$.

If the execution of the customization operation $OP_i$ is finished, which corresponds to ST2="1", the post-customization application AP checks, in step E25, whether a following customization operation $OP_{i+1}$ is to be executed.

If, in step E22, the second status element ST2 is at "0" and indicates that the operation $OP_i$ was not finished when the post-customization was interrupted, the post-customization application AP reads the operation $OP_i$ from the list $LOP_j$ or directly from the application, so as either to deduce therefrom a back-into-consistency operation $OR_i$ or to search the description $DOP_i$ associated with the operation $OP_i$ for the back-into-consistency operation $OR_i$, in order to put all or some of the interrupted customization operation $OP_i$ back into consistency, and in order to finish the interrupted customization operation $OP_i$ or in order to enable said interrupted customization operation to be re-executed correctly. The post-customization application AP executes the back-into-consistency operation $OR_i$, in step E23.

In step E24, the post-customization application AP changes the status element ST2 to the value "1" which, combined with the value "i" of the status element ST1, indicates that execution of the customization operation $OP_i$ is finished.

In step E25, the post-customization application checks whether a following customization operation $OP_{i+1}$ is to be executed.

If a following customization operation is to be executed, the post-customization application points, in step E26, to the new operation $OP_{i+1}$, associates the new value i=i+1 with the status element ST1 and changes the status element ST2 to "0" indicating that a new operation $OP_i=OP_{i+1}$ is being executed.

In step E27, the application AP executes the customization operation $OP_i$ as a function of its customization parameters $POP_i$ that are included in the associated description $DOP_i$.

Then, in step E28, the post-customization application changes the status element $ST_2$ to the value "1" which, combined with the value i of the status element $ST_1$, indicates that execution of the customization operation $OP_i$ is finished. The post-customization application returns to step E25.

So long as not all of the customization operations $OP_1$ to $OP_I$ have been executed and finished, the post-customization application reiterates execution of steps E26 to E28.

As soon as all of the operations have been executed and finished, customization is complete, and the processor PC changes, in step E29, the startup script SDM so as no longer to launch the post-customization application AP every time the smart card $CP_n$ is connected to the terminal T.

In step E30, the processor PC deletes any obsolete post-customization data such as the post-customization application AP, the status ST, the customization operation descriptions $DOP_1$ to $DOP_j$, and, in the first implementation, the list of customization operations $LOP_j$.

In a variant, at each step of the post-customization method, security conditions, such as the presence of a secret, that are related to post-customization are checked by the card.

The invention described herein relates to a method and to a system for customizing smart cards. In a preferred implementation, the steps of the method of the invention are determined by the instructions of a program incorporated in a system, a portion of which program is incorporated in a customization machine MP, and the remainder of which program is incorporated into a smart card $CP_n$. The program comprises program instructions which, when said program is loaded and executed in the system, operation of which is then caused by execution of the program, perform the steps of the method of the invention.

Therefore, the invention also applies to a program, in particular a program on or in an information medium, and adapted to implement the invention. The program can use any programming language, and can be in the form of a source code, an object code, or an intermediate code between a source code and an object code, such as in a partially compiled form, or in any other form desirable for implementing the method of the invention.

The invention claimed is:

1. A method of customizing a smart card comprising:
   pre-customizing said smart card, prior to issuance to a user, by loading data necessary for post-customization into the smart card, from a customization machine of a card manufacturer, said post-customization data including at least a startup script and a post-customization application;
   post-customizing said smart card, upon connection of the smart card to a user terminal, by activating said post-customization application by said startup script for processing the loaded post-customization data and performing post-issuance procedures in order to place the smart card in an operational state.

2. The method according to claim 1, wherein the post-customization data loaded in the smart card further includes customization operations and wherein the post-customization application is configured to execute, during post-customization, all of the customization operations correctly and successively so that the smart card is operational.

3. The method according to claim 2, wherein the customization operations are included in the post-customization application.

4. The method according to claim 2, wherein the customization operations are included in a list of customization operations loaded into the smart card during the pre-customization.

5. The method according to claim 2, further comprising:
   activating a back-into-consistency operation, if after an interruption of any one of the customization operations of post-customization a customization operation being executed has not finished, for putting at least some of the interrupted customization operation back into consistency in order to continue post-customization.

6. The method according to claim 5, wherein the back-into-consistency operation finishes the interrupted customization operation in order to continue post-customization.

7. The method according to claim 2, further comprising:
   deleting the post-customization data upon proper completion of all of the customization operations loaded in the smart card.

8. A method according to claim 2, wherein upon execution of one of the customization operations, a network connection application is activated by said customization operation in order to communicate with a server via the terminal for the purpose of downloading, into the smart card, data and/or codes relating to execution of said customization operation.

9. A system for customizing a smart card comprising:
   pre-customization means for loading data necessary for post-customization into the smart card from a customization machine of a manufacturer, prior to issuance to a user, wherein said post-customization data includes at least a startup script and a post-customization application; and
   post-customization means for post-customizing said smart card upon connection of the smart card to a user terminal, by activating said post-customization application by said startup script for processing the loaded post-customization data and performing post-issuance procedures in order to place the smart card in an operational state.

10. A smart card to be customized comprising:
    post-customization data including at least a startup script and a post-customization application having been loaded into the smart card by a customization machine of a manufacturer, prior to issuance to a user, during pre-customization, wherein said post-customization application is activated by said startup script upon connection of the smart card to a user terminal for processing the loaded post-customization data and performing post-issuance procedures in order to place the smart card in an operational state.

11. A smart card according to claim 10, wherein the post-customization application executes all of the customization operations correctly and successively in order to enable the smart card to be operational.

12. A computer-readable medium containing a program suitable for being implemented in a system for customizing a smart card, said program comprising instructions which, when executed in said system, cause the system to execute the steps of:
    pre-customizing said smart card, prior to issuance to a user, by loading data necessary for post-customization into said smart card, from a customization machine of a manufacturer, said post-customization data including at least a startup script and a post-customization application; and
    post-customizing said smart card, upon connection of the smart card to a user terminal by activating said post-customization application for processing the loaded post-customization data in the smart card and performing post-issuance procedures in order to place the smart card in an operational state.

* * * * *